United States Patent
Klossek et al.

(10) Patent No.: US 12,252,352 B2
(45) Date of Patent: Mar. 18, 2025

(54) BAGGAGE-CONVEYING SYSTEM AND METHOD FOR FILLING A BAGGAGE CAROUSEL OF A BAGGAGE-CONVEYING SYSTEM WITH ITEMS OF BAGGAGE

(71) Applicant: Siemens Logistics GmbH, Nuremberg (DE)

(72) Inventors: Andreas Klossek, Stein-Deutenbach (DE); Bengt Mueck, Nuremberg (DE)

(73) Assignee: Siemens Logistics GmbH, Nuremberg (DE)

( * ) Notice: Subject to any disclaimer, the term of this patent is extended or adjusted under 35 U.S.C. 154(b) by 112 days.

(21) Appl. No.: 18/250,789

(22) PCT Filed: Oct. 1, 2021

(86) PCT No.: PCT/EP2021/077156
§ 371 (c)(1),
(2) Date: Apr. 27, 2023

(87) PCT Pub. No.: WO2022/089875
PCT Pub. Date: May 5, 2022

(65) Prior Publication Data
US 2023/0391559 A1    Dec. 7, 2023

(30) Foreign Application Priority Data
Oct. 27, 2020 (EP) .................... 20204037

(51) Int. Cl.
*B65G 47/244* (2006.01)
(52) U.S. Cl.
CPC .... *B65G 47/244* (2013.01); *B65G 2201/0264* (2013.01)
(58) Field of Classification Search
CPC .......... B65G 2201/0264; B65G 47/244; B65G 47/248
See application file for complete search history.

(56) References Cited

U.S. PATENT DOCUMENTS

| 8,596,947 B1 | 12/2013 | Vogelsang et al. |
| 8,893,877 B2 * | 11/2014 | Tan .......................... B64F 1/366 414/217 |

(Continued)

FOREIGN PATENT DOCUMENTS

| DE | 2155120 A1 | 5/1972 |
| EP | 0456297 A2 | 11/1991 |

(Continued)

OTHER PUBLICATIONS

JP2000128357, (Year: 2000).*

*Primary Examiner* — Gene O Crawford
*Assistant Examiner* — Lester Ill Rushin
(74) *Attorney, Agent, or Firm* — Laurence A. Greenberg; Werner H. Stemer; Ralph E. Locher (57) ABSTRACT

A baggage conveying system and method for space-optimized filling of a baggage carousel of the system with baggage items is provided, because reclaiming of baggage is delayed if baggage carousels at airports have no more capacity. The method includes transporting an item of baggage lying in a flat, stable transport position on a first conveying line of the system; standing up the item of baggage from the transport position into an upright position, the item of baggage taking up less contact area on the system in the upright position than the transport position; placing the item of baggage onto an empty place of the baggage carousel; moving the item of baggage in the upright position on the previously empty place, which is now filled, using the baggage carousel. The capacity of the baggage carousel is drastically increased while the space required by the baggage carousel remains the same.

16 Claims, 3 Drawing Sheets

(56) References Cited

U.S. PATENT DOCUMENTS

| | | | |
|---|---|---|---|
| 10,087,022 B2* | 10/2018 | Vogelsang | B65G 15/64 |
| 2021/0201218 A1* | 7/2021 | Guiol | G06Q 10/083 |
| 2021/0283780 A1* | 9/2021 | Kilibarda | B25J 9/163 |
| 2022/0097982 A1* | 3/2022 | Uretsky | B65G 67/00 |

FOREIGN PATENT DOCUMENTS

| | | |
|---|---|---|
| EP | 3235764 A1 | 10/2017 |
| EP | 3305691 A1 | 4/2018 |
| WO | WO 2008082300 A1 | 7/2008 |

* cited by examiner

BAGGAGE-CONVEYING SYSTEM AND METHOD FOR FILLING A BAGGAGE CAROUSEL OF A BAGGAGE-CONVEYING SYSTEM WITH ITEMS OF BAGGAGE

FIELD AND BACKGROUND OF THE INVENTION

The present invention relates to a baggage conveying system and a method for filling a baggage carousel of a baggage conveying system with items of baggage according to the independent claims.

Passengers and baggage handlers will unload items of flight baggage by way of baggage carousels. A baggage carousel is automatically loaded at one or more loading sites. The item of baggage is kept and rotated on the baggage carousel until it is removed. If the item of baggage is not removed immediately, it passes the loading site again and so no further item of baggage can be loaded onto the baggage carousel. Simple detectors, for instance simple light barriers, are used to determine whether the baggage carousel in the loading area has space for a loading. Loading is only permitted when the loading area has an empty place with predefined dimensions.

The surface area of the baggage carousel is limited. If passengers arrive at the baggage carousel later than their items of baggage, the loading of the baggage carousel can be permanently blocked. Further items of baggage cannot be loaded onto the baggage carousel. This may result in delays in unloading aircraft and in passengers having to wait an unnecessarily long period of time for their baggage. With large flights, waiting passengers whose baggage is backed up can block access to the baggage carousel.

These problems are mitigated by means of a number of measures. Inclined baggage carousels can be loaded with a second row of baggage. However, with a double row loading, the baggage belts are heavily loaded, and removal is difficult and in some instances impossible for smaller people without assistance. If the second row is already occupied, further items of baggage have to wait at the loading point, the consequences of which have already been discussed. The items of baggage from large flights are divided onto several baggage carousels (separated into Priority/Business/First Class). The inclined surface area is increased in size for a third row of items of baggage. This increases the capacity of the baggage carousel as a storage facility, although it is barely possible to remove the items of baggage in the third row or only with significant difficulty. Furthermore, longer and more baggage carousels are built, or the problem is simply accepted.

SUMMARY OF THE INVENTION

The object underlying the present invention is therefore to provide an improved solution. This object is achieved by the solutions described in the independent claims. Advantageous embodiments of the invention will emerge from the subclaims.

In respect of a method, the object cited in the introduction is achieved by a method for filling a baggage carousel of a baggage conveying system with items of baggage. The method comprises the method steps:

a) Transporting an item of baggage lying in a transport position on a first conveying line of the baggage conveying system, wherein the transport position is a flat, stable position of the item of baggage.

b) Changing the position of the item of baggage comprising standing up the item of baggage from the transport position into an upright position, wherein in the upright position the item of baggage takes up less contact area on the baggage conveying system than in the transport position.

c) Placing the item of baggage onto an empty place of the baggage carousel.

d) Moving the item of baggage in the upright position onto the previously empty place, which is now filled, with the baggage carousel.

In order to guarantee reliable transportation, items of baggage in airport baggage conveying systems are always conveyed in the transport position. This is essential in particular with tilted conveying lines, rapid accelerations and transitions between the conveying line sections. The transport position is understood to refer to lying the widest side of the item of baggage on the conveying line so that the item of baggage lies flat on the conveying line; this tends to be the most stable position. Other positions tend to be more unstable; suitcases frequently have rollers on the narrow side. To ensure that all items of baggage are in the transport position, suitcase ejectors are used in airport baggage conveying systems. During transportation in the transport position, the items of baggage have a very unfavorable position with respect to space utilization. The position of the item of baggage is to be understood to mean both the position of the item of baggage on the baggage conveying system but also, as the three-dimensional position, the alignment of the item of baggage in the space.

By standing the items of baggage up before filling the baggage carousel, the items of baggage take up less space on the baggage carousel, which means a greater capacity.

The baggage carousel can therefore be filled in a space-optimized manner.

The method can also be applied if the item of baggage was disposed in a transport tray before the filling process, in other words was transported in the transport tray on the first conveying line.

Standing up the item of baggage comprises rotating the item of baggage about at least one horizontal axis. Standing up the item of baggage can be carried out sequentially or at the same time as further changes in position of the item of baggage.

The inventive solution can be further improved by different, in each case advantageous embodiments per se which, unless stated otherwise, can be combined with one another as required. Reference is made below to these embodiments and to the advantages associated with them.

In order to optimize the use of space even further, the change in position of the item of baggage may comprise rotating the item of baggage about a vertical axis so that before the item of baggage is placed onto the empty place, a shortest side of the contact area of the item of baggage is aligned in the upright position along the empty place of the baggage carousel. This change in position can be carried out at the same time as standing up the item of baggage or beforehand or afterwards.

If the item of baggage is arranged with its shortest side/edge along the carousel running direction, the baggage carousel has an even greater capacity with the same run length.

According to one embodiment, detection of dimensions and/or shape and/or position of the item of baggage can take place in the transport position and/or the upright position, wherein the change in position of the item of baggage is carried out on the basis of the detected dimensions and/or the detected shape and/or position. The position is preferably determined three-dimensionally.

In order to further optimize the utilization of space and thus to increase the capacity still further, the empty place for the item of baggage can be selected on the basis of the contact area of the item of baggage in the upright position. With the prior art, an empty place is sought for the largest possible permitted dimensions of the item of baggage on the baggage conveying system. The inventive solution allows for an improved filling process. Only one empty place of an adequate size has to be found for each item of baggage. Larger empty places can be filled with one or also with a number of smaller items of baggage.

According to one embodiment, the baggage carousel can have freely selectable or predefined empty places with the same and/or different dimensions, wherein the predefined empty places are arranged one behind the other along a transport direction of the baggage carousel and predefined empty places which follow one another have supporting elements as a partition for supporting the items of baggage in the upright position. Since the carousel running direction is arranged essentially at right angles to the partitions, standing a suitcase on its wheels is also unproblematic, particularly if the carousel contact area is still slightly tilted. The supporting elements can be positioned in a fixed or variable manner and the dimensions of the empty places, in particular limited by the distances between the supporting elements, determine the dimensions of the supporting elements. The supporting elements can be of the same or a different size, in particular different height. If the supporting elements are sufficiently stable, items of baggage, which cannot be upright for reasons of stability (for instance flexible travel bags) or larger items of baggage lie on one or more supporting elements and are thus positioned above the main contact area of the baggage carousel, while an upright, sufficiently narrow item of baggage is loaded into an empty place between two supporting elements. The empty places are therefore predefined and can still be used flexibly.

According to one embodiment, at least one further property of the item of baggage, for instance stiffness and/or contours and/or position of handles and/or rollers, can be detected and the change in position can be determined therewith on the basis of the detected at least one further property. The change in position can therefore be carried out not only with the objective of the smallest contact area, but it is instead possible also to take into consideration that the item of baggage is positioned on the baggage carousel so that removal is particularly easy, for instance by the handles being aligned toward the passenger and the suitcase being on its rollers. The position of the handles and the rollers can be identified with the aid of a plurality of technologies. The position of the rollers and/or handles can also be established on the basis of the shape (outlines, contours). To enable an even more reliable and constantly improving identification, the baggage conveying system may be able to iteratively learn whether the detected further property has been determined correctly and with sufficient accuracy so that determination errors continue to reduce in number.

According to one embodiment, it is only possible to stand up the item if it is sufficiently stable in the upright position. Therefore, for example a very soft travel bag without stable components is not able to keep itself in the upright position, even when supported by one or two supporting elements. Using the detected property (properties) of the item of baggage, it is possible to automatically determine whether in the upright position the stability is adequate for the process. This assessment can also take place manually in individual cases even when an automated assessment is preferred.

According to one embodiment, the item of baggage can be stood up by jointly rotating the first and a second conveying line together with the item of baggage, wherein the item of baggage first lies in the transport position on the first conveying line and the second conveying line is arranged as a lateral wall of the first conveying line. Moreover, a third conveying line, which is firstly the cover before the joint rotation of the conveying line, which cover can be moved in the direction of the item of baggage, and can thus fix this during the rotation. It is useful if before being stood up the item of baggage has already been rotated about a vertical axis so that the item of baggage is aligned with its edges along the conveying lines.

Therefore, according to one embodiment, the change in position can comprise the rotation of the item of baggage about a vertical axis, by the item of baggage lying on two conveying units of the first conveying line, for instance conveyor belts, and these being controlled independently of one another.

The invention is characterized by a baggage conveying system comprising means for carrying out the inventive method. The inventive baggage conveying system comprises a first conveying line, a baggage carousel, a position changing apparatus and a placement apparatus. The first conveying line is designed to transport an item of baggage lying in a transport position on this first conveying line, wherein the transport position is a flat, stable position of the item of baggage. The position changing apparatus is designed to stand up the item of baggage from the transport position into an upright position, wherein in the upright position the item of baggage takes up less contact area than in the transport position. And the placement apparatus is designed to place the item of baggage selectively onto an empty place of the baggage carousel which is matched to the item of baggage in the upright position.

Whether the transport position as a flat, stable position is now in fact the most stable position of the item of baggage is irrelevant to the implementation of the inventive method. What is relevant is that an optimization of the original position is carried out, here referred to as the transport position, into a position in which space utilization of the baggage carousel is optimized.

If applicable, the conveying system has the same advantages which are stated with respect to the presented method.

According to one embodiment, the position changing apparatus can be designed to rotate the item of baggage about a horizontal and/or vertical axis, so that before placement onto the empty place, a shortest side of the contact area of the item of baggage is aligned along the empty place of the baggage carousel. The position changing apparatus can comprise a number of separate apparatuses/units. The rotation of the item of baggage about a vertical axis can be carried out by the position changing apparatus by the item of baggage lying on two conveying units of the first conveying line, for instance conveyor belts, and these being controlled independently of one another, the first conveying line is thus included in the position changing apparatus.

According to one embodiment, the baggage conveying system can moreover comprise a detection unit for detecting dimensions and/or shape and/or position of the item of baggage in the transport position and/or the upright position, wherein the position changing apparatus is designed to carry out a change in position of the item of baggage on the basis of the detected dimensions and/or detected shape and/or position and/or the detection unit is designed to detect at least one further properties of the item of baggage, for instance stiffness and/or contours and/or position of the handles and/or rollers, wherein the position changing apparatus is designed to determine the change in position on the basis of the at least one further property detected.

According to one embodiment, the placement apparatus can be designed to select the empty place for the item of baggage on the basis of the contact area of the item of baggage in the upright position and/or the position changing apparatus can be designed to carry out the change in position only when the item is sufficiently stable in the upright position.

According to one embodiment, the baggage carousel can have freely selectable or predefined empty places with the same and/or different dimensions, wherein the predefined empty places can be arranged one behind the other along a transport direction of the baggage carousel and predefined empty places which follow one another can have supporting elements as a partition for supporting the items of baggage in an upright position. An item of baggage can rest on the supporting elements/partitions between two different empty places, therefore the empty places are still predefined and yet can also be used flexibly for items of baggage with a differently sized contact area. It is possible to position the supporting elements in a variable manner in order to enable a free selectability of the empty places.

According to one embodiment, the position changing apparatus can comprise the first and a second conveying line, arranged so that the item of baggage first lies in the transport position on the first conveying line and the second conveying line can be arranged as a lateral wall of the first conveying line and wherein the position changing apparatus can be designed for joint rotation of the first and second conveying line together with the item of baggage so that after rotation, the item of baggage rests in the upright position on the second conveying line. Moreover, a third conveying line, which is arranged opposite the first conveying line and can be rotated with the first and second conveying line, can be included in the position changing apparatus.

Embodiments of the invention are explained by way of example in more detail below on the basis of the figures.

DETAILED DESCRIPTION OF THE INVENTION

Figure 1:
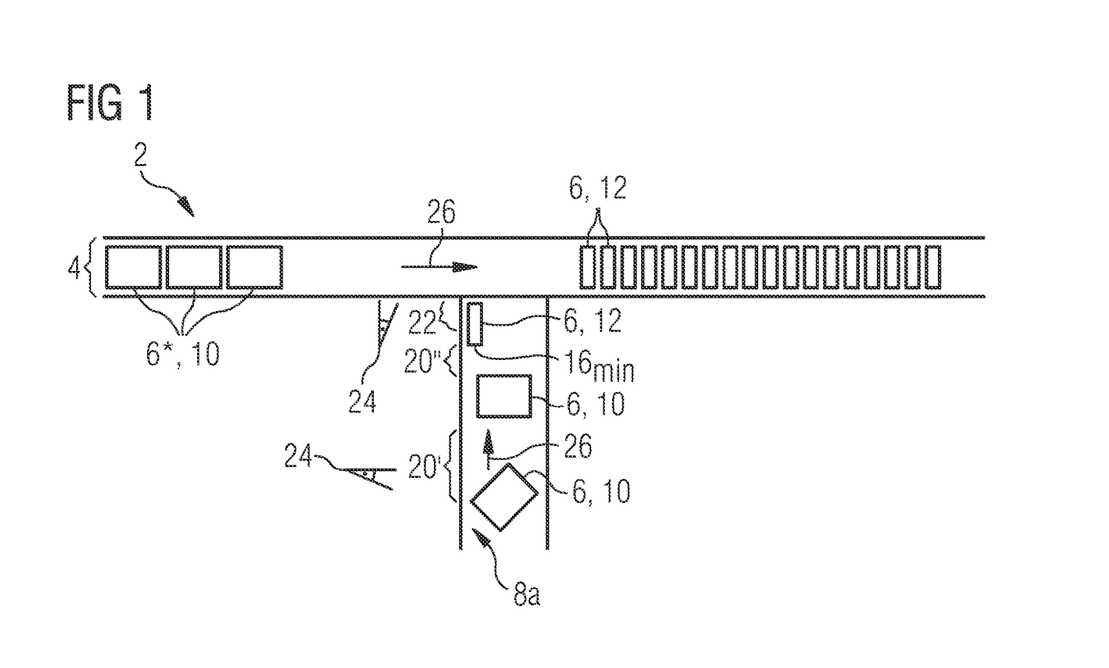
FIG. 1 shows an inventive baggage conveying system.

FIG. 1 shows a baggage conveying system 2 according to an embodiment of the invention. Items of baggage 6 are transported on a first conveying line 8a toward the baggage carousel 4 and a detector 24 detects the three-dimensional position of the item of baggage 6 firstly lying in a flat, stable transport position 10 on the conveying line 8. Using the detected position, the position of the item of baggage 6 is changed with a position changing apparatus 20. In FIG. 1, the items of baggage 6 are firstly rotated about a vertical axis and then rotated about a horizontal axis and thus positioned in an upright position 12 such that their contact area is minimized. The items of baggage 6 are then placed onto the baggage carousel 4 and rotate with this until being removed by the passenger.

To illustrate the space saving of the invention, three items of baggage 6* lying in the transport position 10 are shown on the left side of the baggage carousel 4. Items of baggage 6 in the upright position 12 are shown to the right. For illustration purposes, all items of baggage 6, 6* are of the same size, even when this does not match the reality of an airport. By means of the inventive method, the capacity is increased by a factor of three in the case of the shown size of items of baggage with the same carousel size.

Figure 2:
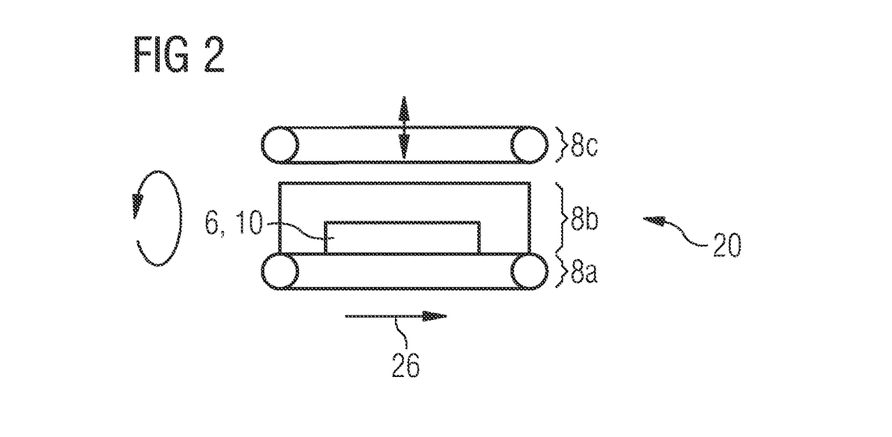
FIG. 2 shows a position changing apparatus.

FIG. 2 shows a position changing apparatus 20 according to an embodiment of the invention. The position changing apparatus 20 comprises a first conveying line 8a and a second conveying line 8b, which are arranged as a lateral wall with respect to the first conveying line 8a. The embodiment shown in FIG. 2 moreover has an optional third conveying line 8c, which, similarly optionally, can be moved as far as the first item of baggage 6 lying in the transport position 10 on the first conveying line 8a. This can also only take place during the subsequent step. The third conveying line 8c is pressed against the item of baggage in order to prevent the item of baggage 6 from falling in the position changing apparatus 20. The rotation about the direction of travel axis 26 is completed. The item of baggage is placed upright onto the baggage carousel 4.

The three conveying lines 8a, 8b, 8c are arranged in a u-configuration. Firstly, the item of baggage 6 in the transport position is conveyed along the common transport direction 26 of the conveying lines 8a, 8b, 8c and the conveying lines 8a, 8b, 8c are rotated jointly so that the item of baggage 6 then lies in the upright position 12 on the second conveying line 8b. The item of baggage 6 tilts from one conveyor 8a to the next 8b.

With the slanted position of the first conveying line 8a which is associated with the rotation of the conveying lines 8a, 8b, 8c, the item of baggage 6 slides toward the second conveying line 8b and aligns itself herewith, but not necessarily in such a way that the shortest edge of the contact area is then aligned in the upright position 12 along the transport direction 26 of the baggage carousel 4. In order to achieve this, the item of baggage 6 must moreover be rotated separately about a vertical axis and thus aligned optimally before or after being stood up. This can be achieved for instance with a two-part conveying line 8 with separately controllable conveyor belts on which the item of baggage 6 lies at the same time. For placement onto the baggage carousel 4, the conveying line 8b acts like the placement apparatus 22.

Similar tilting of the items of baggage 6 can be achieved by two conveyors 8a, 8b folding up into a v-shape and then rotating about 45 degrees. The item of baggage 6 tilts onto a side 8a/8b.

A further detector 24 monitors the baggage carousel 4. This ensures that an item of baggage 6 is placed onto the baggage carousel 4 only when there is an empty place 14, 14' of an adequate size.

The position changing apparatus 20 can also be designed completely differently, for instance as a gripper robot 20, 22, which at the same time also acts as a placement apparatus 22 and grips the item of baggage 6 and stands it up and places the optimally aligned item of baggage 6, 12 directly onto the baggage carousel 4.

It is naturally also possible according to the invention for a position changing apparatus 20 and the placement apparatus 22 to be realized in a manner other than the described manners; various specialist technologies are available to the person skilled in the art. The detectors 24 generate data of the items of baggage 6, the position identification and identification of the shape and/or outlines can be carried out with the aid of strategically positioned light grids 24, but also with image analysis methods or other methods.

For optimal filling, standing-up and alignment, it is advantageous to know the position of the item of baggage 6 and its dimensions before the manipulation. It is also useful to use even further properties of the item of baggage 6, for instance shape, stiffness, contours, position of the handles and rollers etc., for determining the end position of the item of baggage 6 on the baggage carousel 4. These are determined with detectors 24. For removal purposes, it is ergonomically advantageous for passengers if the rollers do not point upwards and the handles or pull-out handles point in his/her direction or at least upward. This should be taken into account where possible.

The baggage conveying system 2 comprises a background system which is able to plan and carry out the change in position of the item of baggage 6 as a function of the properties detected by the detectors 24. A soft travel bag 6 does not have sufficient stability to be stood up in an upright position 12; in this case an alignment of the shortest side in the transport position 10 along the transport direction 26 of the baggage carousel 4 is preferred.

Figure 3A:
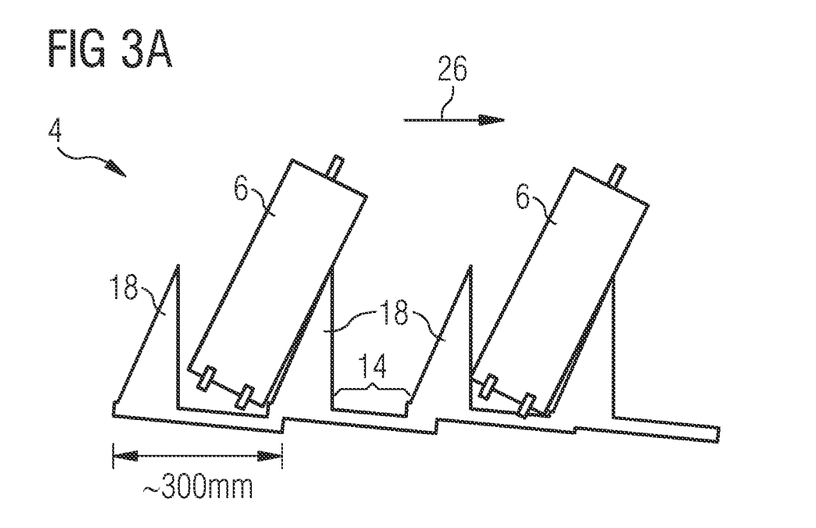
FIGS. 3a-c show baggage conveying carousels with support elements.
Figure 3B:
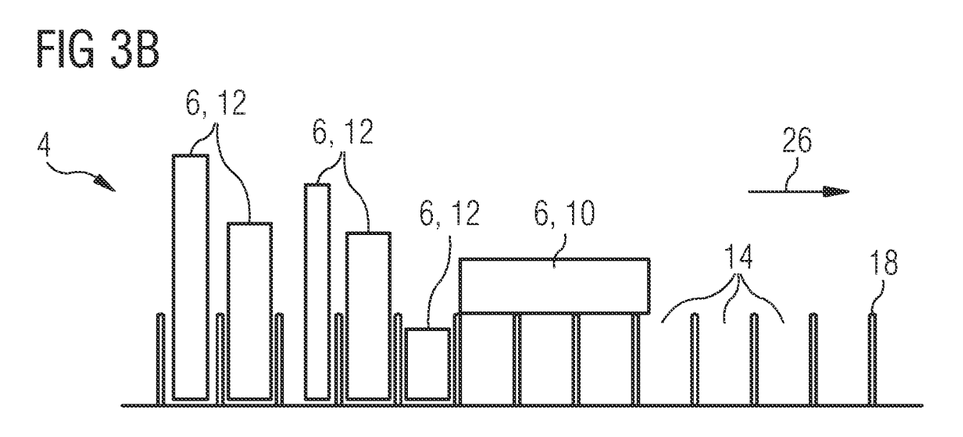
Figure 3C:
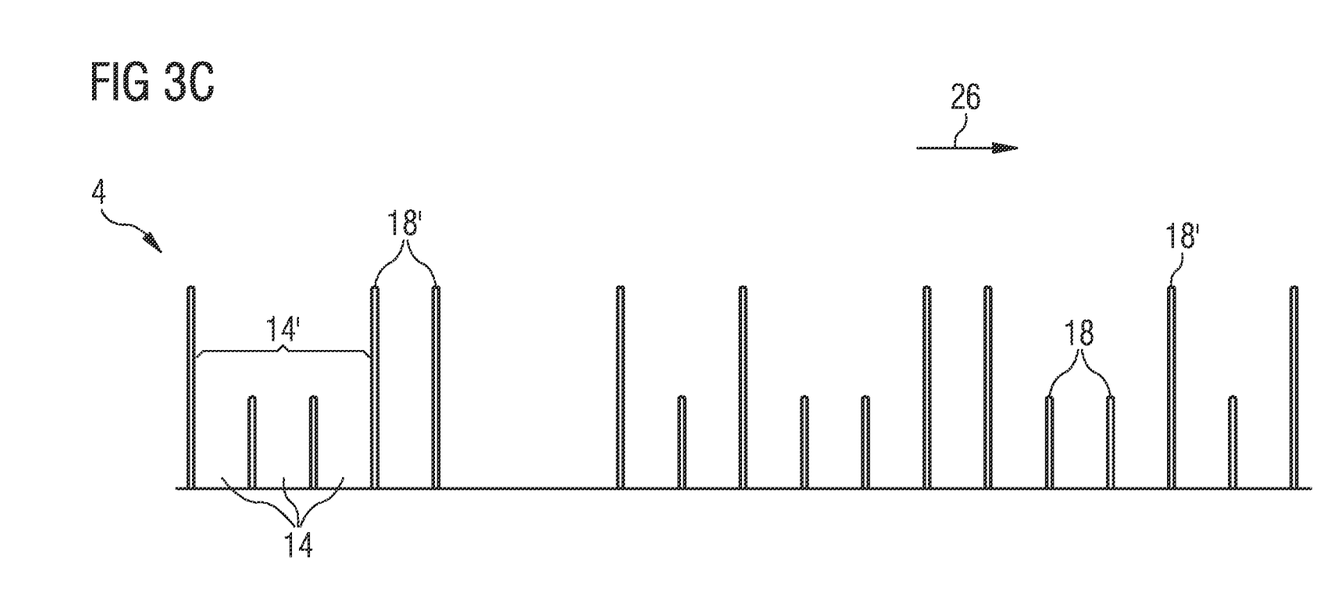

FIGS. 3a, 3b, 3c show lateral views of baggage carousels according to the invention, which have support elements 18 for the partition between the baggage carousel empty places 14.

The support elements 18 in FIG. 3a are wedge-shaped, but other shapes are also possible or simple shelf-type partitions 18 as in FIGS. 3b and 3c. The items of baggage 6 can be placed in the upright position 12 in empty places 14 arranged between the support elements 18. With an embodiment of the support elements 14 which does not have excessively sharp edges and is stable, for instance by selecting a soft PU material, an item of baggage 6, which cannot/will not be placed in an upright position 12, can also be placed in the transport position 10 on a number of support elements 18. An empty place 14' then extends across a number of support elements 18' and the item of baggage 6, 10 is still supported by the larger support elements 18'. Baggage trays can also lie on a number of support elements 18.

The support elements 18, 18' in FIG. 3c have different heights; the choice of the empty places 14', 14 is variable. The taller support elements 18' also support items of baggage 6 lying on shorter support elements 18 in the transport position 10 and thus define larger empty places 14', which can also be used, as required, as a number of smaller empty places 14. The frequency of the regularly occurring taller support elements 18' but also the omission of shorter support elements 18 is adjusted to the typical baggage spectrum of the particular airport.

The support elements 18, 18' are advantageously arranged on the sleds of the baggage carousel 4 such that items of baggage 6 lie on just one sled. The risk of items of baggage 6 becoming caught is therefore reduced. It is likewise a possibility to use support elements 18, 18' which can be positioned in a variable manner, which are pressed against the item of baggage 6 before, during or after the item of baggage 6 is placed onto the corresponding empty place 14. The space requirement is minimized still further and the item of baggage 6 is so well supported by the support elements 18 that very soft items of baggage 6 can also be stood up.

According to a further embodiment, the baggage carousel 4 is loaded directly with baggage 6 by conveyor belts 8 as a placement apparatus 22. In a first optimization stage, a sensor 24 on the baggage carousel 4 upstream of the loading point determines a gap which is sufficiently large for the particular item of baggage 6 being loaded. This gap 14 does not need to be large enough to accommodate the largest permitted item of baggage in terms of its maximum dimension at a distance from the surrounding items of baggage 6. This already increases the capacity of the baggage carousel 4, even without optimizing the position of the item of baggage 6.

For a more optimal utilization of space, the shape and position of each item of baggage is determined upstream of the placement apparatus 22 for ejection onto the baggage carousel 4. This can take place by way of light grids.

In a second optimization stage, after the position has been identified, the item of baggage 6 is rotated in the vertical axis so that only one length, which corresponds to the short side lengths, is required on the baggage carousel 4. An additional baggage rotation device 20 is required. This can take place by means of conveyors 8 with two parallel and individually controllable belts. Devices for rotating the conveyed item 6 are known.

In a third optimization stage, the three-dimensional item of baggage 8 is rotated from the transport position 10, in which the item of baggage 6 lies mostly flat on the conveyor equipment with the shortest edge pointing upward. By means of the rotation in the second optimization stage about the vertical axis, the shortest edge (likewise vertical) cannot be moved into the transport direction of the baggage carousel 4. A second rotation device 20 in the transport direction 26 aligns the item of baggage 6 in an upright position 12. The required space on the baggage carousel 4 is reduced accordingly to the shortest edge of the item of baggage 4. In accordance with the invention, suitcases 6 are then preferably conveyed on the baggage carousel 4 upright next to one another and not lying in the transport position 10.

The sequence in which the optimization stages are carried out is in principle irrelevant.

In most cases, suitcases 6 have a handle on a longitudinal side and feet on the opposite side. They are more stable on their feet and a rotation onto the feet is therefore advantageous. As a further optimization, the position of the foot and handle side is identified using artificial intelligence (e.g. by processing the read results of the light grid sensors 24 from the position identification). The rotations are controlled so that at the end the item of baggage 6 stands on the feet.

Items of baggage which are not suitable for upright transportation can be trained into the artificial intelligence and then identified.

Since items of baggage in the upright position 12 can tip over, this is prevented by a suitable, laterally supporting structure (FIGS. 3a, 3b, 3c). This is suitable in particular for slanted baggage carousels 4.

With the aid of the invention, the space on a baggage carousel 4 is better utilized. The dimensions of suitcases 6 differ. As an example of the space saving, typical dimensions of 79×50×30 cm will be used. In the first optimization stage, 79 cm and a distance of approx. 10 cm is required on the baggage carousel 4, in other words 89 cm of space.

Only 50 cm+10 cm=60 cm is required in the second optimization stage. If the suitcases 6 are transported in the upright position 12, then 30 cm+10 cm=40 cm is sufficient. Less than half of the space is required. Even with a small suitcase of 55×40×20 cm, there is a saving of 65 cm to 30 cm. Therefore, more than twice as many suitcases can be stored on the same length. Larger and more flights can be processed on the baggage carousel 4.

In the greenfield scenario, fewer baggage carousels 4 can be provided. In addition to the improved utilization of space on the baggage carousel 4, there is also an ergonomic advantage for the passenger. The handles point upward (flat baggage carousel 4) or toward the passenger removing an item (slanted baggage carousel 4). The item of baggage 6 can be gripped and removed more easily.

The invention is suitable not only for baggage carousels 4 outputting items of baggage 6 to the passengers, but rather also for baggage carousels 4 and other end points in the loading and logistics sector.

LIST OF REFERENCE CHARACTERS

2 Baggage conveying system
4 Baggage carousel
6 Item of baggage
8 Conveying line
10 Transport position
12 Upright position
14 Empty place
16$_{min}$ Shortest side of an item of baggage
18 Support element
20 Position changing apparatus
22 Placement apparatus
24 Detector/detection unit
26 Transport direction

The invention claimed is:

1. A method for filling a baggage carousel of a baggage conveying system with items of baggage, the method comprising steps of:
   a) transporting an item of baggage lying in a transport position on a first conveying line of the baggage conveying system, the transport position being a flat, stable position of the item of baggage;
   b) changing a position of the item of baggage including standing up the item of baggage from the transport position into an upright space-saving position, the item of baggage taking up less contact area on the baggage conveying system in the upright space-saving position than in the transport position;
   c) placing the item of baggage on an empty place of the baggage carousel while maintaining the space-saving position; and
   d) moving the item of baggage in the upright position to fill the previously empty place of the baggage carousel while maintaining the space-saving position.

2. The method according to claim 1, which further comprises changing the position of the item of baggage including rotating the item of baggage about a vertical axis, to align a shortest side of the contact area of the item of baggage along the empty place of the baggage carousel before the item of baggage is placed onto the empty place.

3. The method according to claim 2, which further comprises detecting at least one of dimensions or shape or position of the item of baggage in at least one of the transport position or the upright position, and carrying out the change in position of the item of baggage based on the at least one of detected dimensions or the detected shape or position.

4. The method according to claim 1, which further comprises selecting the empty place for the item of baggage based on the contact area of the item of baggage in the upright position.

5. The method according to claim 1, which further comprises providing the baggage carousel with the empty places being freely selectable or predefined and having at least one of equal or different dimensions, locating the predefined empty places one behind another along a transport direction of the baggage carousel, and providing the predefined empty places following one another with supporting elements as a partition for supporting the items of baggage in the upright position.

6. The method according to claim 2, which further comprises detecting at least one further property of the item of baggage including at least one of stiffness or contours or position of at least one of handles or rollers, and determining the change in position based on the detected at least one further property.

7. The method according to claim 2, which further comprises only carrying out the change in position when the item is sufficiently stable in the upright position.

8. The method according to claim 1, which further comprises standing up the item of baggage by jointly rotating the first conveying line and a second conveying line together with the item of baggage, the item of baggage first lying in the transport position on the first conveying line and the second conveying line being disposed as a lateral wall of the first conveying line.

9. The method according to claim 2, which further comprises rotating the item of baggage about a vertical axis during the change in position by placing the item of baggage on two conveying units of the first conveying line, and controlling the two conveying units independently of one another.

10. The method according to claim 9, which further comprises providing conveyor belts as the two conveying units.

11. A baggage conveying system, comprising:
    a first conveying line, a baggage carousel, a position changing apparatus and a placement apparatus;
    a) said first conveying line configured to transport an item of baggage lying in a transport position on said first conveying line, said transport position being a flat, stable position of the item of baggage;
    b) said position changing apparatus configured to stand up the item of baggage from said transport position into an upright space-saving position, the item of baggage taking up less contact area in said upright space-saving position than in said transport position; and
    c) said placement apparatus configured to place the item of baggage selectively onto an empty place of said baggage carousel being matched to the item of baggage in while maintaining said upright space-saving position.

12. The baggage conveying system according to claim 11, wherein said position changing apparatus is configured to rotate the item of baggage about at least one of a horizontal axis or a vertical axis, for aligning a shortest side of a contact area of the item of baggage along said empty place of said baggage carousel before placement onto said empty place.

13. The baggage conveying system according to claim 11, which further comprises:
    a detection unit for detecting at least one of dimensions or shape or position of the item of baggage in at least one of said transport position or said upright position;
    said position changing apparatus configured to carry out a change in position of the item of baggage based on at least one of the detected dimensions or detected shape or position, or
    said detection unit configured to detect at least one further property of the item of baggage, including at least one of stiffness or contours or position of handles or rollers; and said position changing apparatus configured to determine the change in position based on said detected at least one further property.

14. The baggage conveying system according to claim 11, wherein said placement apparatus is configured to select said empty place for the item of baggage based on a contact area of the item of baggage in said upright position, or said position changing apparatus is configured to carry out the change in position only when the item of baggage is sufficiently stable in said upright position.

15. The baggage conveying system according to claim 11, wherein said empty places of said baggage carousel are freely selectable or predefined and have at least one of equal or different dimensions, said predefined empty places are disposed one behind another along a transport direction of said baggage carousel, and said predefined empty places following one another have supporting elements as a partition for supporting the items of baggage in said upright position.

16. The baggage conveying system according to claim 11, wherein:
- said position changing apparatus includes said first conveying line and a second conveying line;
- said first and second conveying lines configured to cause the item of baggage to first lie in said transport position on said first conveying line;
- said second conveying line configured as a lateral wall of said first conveying line; and
- said position changing apparatus configured for joint rotation of said first and second conveying lines together with the item of baggage, causing the item of baggage to rest in said upright position on said second conveying line after rotation.

\* \* \* \* \*

UNITED STATES PATENT AND TRADEMARK OFFICE
CERTIFICATE OF CORRECTION

| | | |
|---|---|---|
| PATENT NO. | : 12,252,352 B2 | Page 1 of 1 |
| APPLICATION NO. | : 18/250789 | |
| DATED | : March 18, 2025 | |
| INVENTOR(S) | : Andreas Klossek et al. | |

It is certified that error appears in the above-identified patent and that said Letters Patent is hereby corrected as shown below:

In the Claims

Claim 11, Column 10, Lines 44-48 should read as follows:
(c) said placement apparatus configured to place the item of baggage selectively onto an empty place of said baggage carousel being matched to the item of baggage while maintaining said upright space-saving position.

Signed and Sealed this
Twenty-second Day of April, 2025

Coke Morgan Stewart
*Acting Director of the United States Patent and Trademark Office*